Jan. 8, 1935. G. E. HULSE Re. 19,415
REFRIGERATION SYSTEM AND APPARATUS
Original Filed Oct. 23, 1930
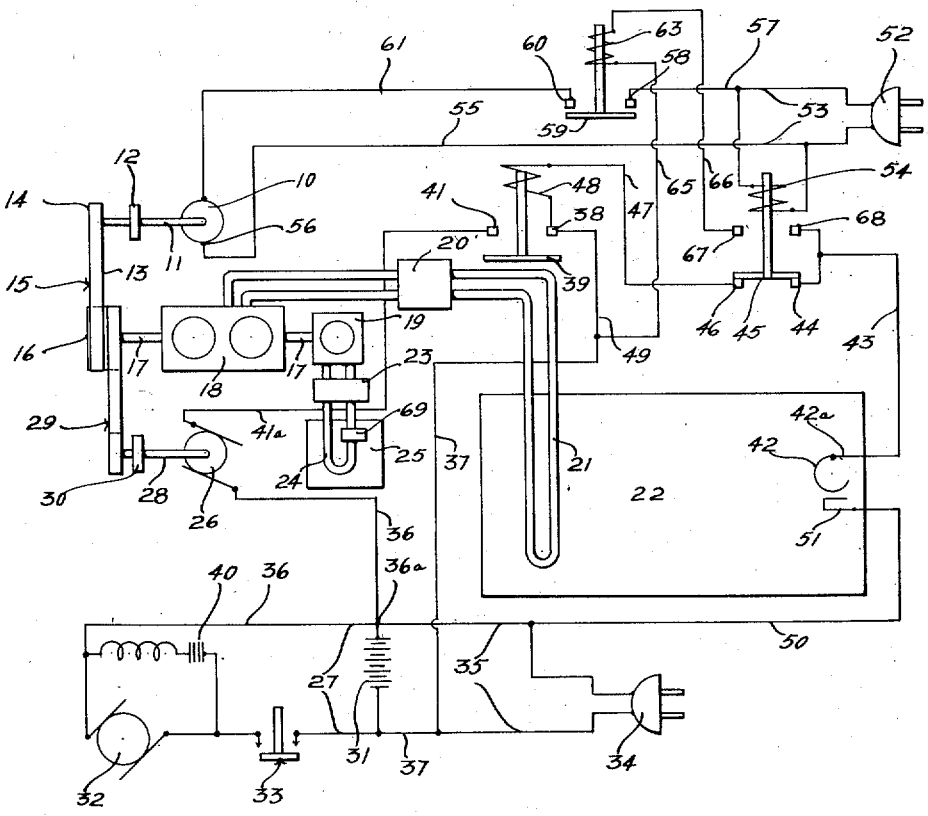
George E. Hulse
INVENTOR
BY
Janney Blair & Curtis ATTORNEYS Reissued Jan. 8, 1935 Re. 19,415

UNITED STATES PATENT OFFICE 19,415

REFRIGERATION SYSTEM AND APPARATUS

George E. Hulse, New Haven, Conn., assignor to The Safety Car Heating & Lighting Company, a corporation of New Jersey Original No. 1,943,966, dated January 16, 1934, Serial No. 490,598, October 23, 1930. Application for reissue October 30, 1934, Serial No. 750,711

34 Claims. (Cl. 62—117)

This invention relates to a refrigeration system and apparatus.

One of the objects of this invention is to provide a refrigeration system and apparatus of simple and practical arrangement and of dependable and lasting action. Another object of this invention is to provide a refrigeration system and apparatus which will be highly efficient in operation while reliably meeting certain peculiar and limited conditions met with in practice. Another object is to provide a refrigeration system which will be dependable and economical in operation. Another object is to provide a refrigeration system which will require a minimum amount of attention while in operation, which will be substantially fool-proof, and which may be operated by unskilled attendants without danger of harming the apparatus. Another object of this invention is to provide a refrigeration system well suited to meet the variable conditions of climate and weather while in use. Other objects will be in part obvious or in part pointed out.

This invention accordingly consists in the features of construction, combination of elements, and arrangement of parts as will be exemplified in the structure to be hereinafter described, and the scope of the application of which will be indicated in the following claims.

In the accompanying drawing in which is shown one of the various possible embodiments of the mechanical and electrical features of this invention, the single figure is a diagrammatic view showing a preferred arrangement of the parts in my refrigeration system.

As conducive to a clearer understanding of certain features of my invention, it may be well at this point to note that in railroad cars, and more particularly in dining cars, it is convenient to have two separate refrigeration compartments. The nature of the food stuffs to be stored in these dining cars is such that for most efficient and sanitary storage, these foods should be maintained at different temperatures. For instance, the ordinary meats, eggs, fruit and the like should be maintained at a temperature of substantially 35° F., while certain frozen food stuffs, such as ice cream, are maintained in their proper condition more satisfactorily if they are contained in a space whose temperature is approximately 10° F. Further, damage or detriment might be wrought to foods of the first group, such as meat, if they are maintained at a temperature as low as 10°. Thus it is inexpedient and disadvantageous to have one refrigerating container for all the food stuffs to be stored. Furthermore, if the refrigerating systems on these dining cars are to be operated by electric motors, the axle-driven generators, generally of limited capacity, and batteries for supplying current to the motors are subjected to a considerable load and sometimes to overstrain. For instance, the cars may be laid over or sidetracked for a period of time, and if the generator for charging the storage batteries is driven from the axle of the car, the storage battery will then be required to supply a sufficient amount of energy for the driving motors during this time and will not be recharged by the generator because of its inactivity. This invention aims to provide a simple and thoroughly practical construction and apparatus for overcoming the above-mentioned and other difficulties.

Referring now to the drawing in detail there is shown a motor 10, preferably a universal motor, and hence adapted to be operated by either alternating or direct current. Preferably motor 10 is constructed to operate upon commercial voltages, such as 110 volts. Motor 10 drives the compressors 18 and 19 of two separate refrigeration units through a driving means generally indicated at 15. Disposed on a shaft 11 between the drum 14 and the motor 10 is a centrifugal clutch 12. The drum 14 is connected by a belt 13 to a drum 16 on the main driving shaft 17. This centrifugal clutch 12 is so constructed that it will connect the motor 10 with the drum 14 upon this motor reaching its normal speed. However, if the shaft 17 is being rotated by other means, as will be explained hereinafter, the centrifugal clutch 12 will not be actuated and thus the motor 10 will not be rotated.

The main driving shaft 17 actuates the moving parts of my two refrigeration systems, including the compressors 18 and 19. Disposed in operative relation with the compressor 18 are the other parts diagrammatically indicated at 20 of a refrigeration system of the compression-expansion construction, and extending from these parts 20 into the refrigerating compartment 22 is the refrigerating coil 21. Similarly the corresponding parts 23 of a separate refrigeration system of the compression-expansion type are disposed in operative relation with the compressor 19, and extending therefrom into the compartment 25 is a refrigerating coil 24. A thermostatically controlled valve 69 is positioned inside the compartment 25 to control the flow of the refrigerant through the coil 24. This valve is so adjusted that when the temperature in this compartment 25 rises above that preferred, it will open, allowing passage of the refrigerant into the coil 24; but upon the temperature of this compartment 25 reaching that preferred, this thermostatic valve will close and stop the flow of the refrigerant through the coil 24. By this construction I have provided two separate refrigeration systems for cooling respectively the compartments 22 and 25, the compressors for these separate units being driven by the main driving shaft 17.

A direct current motor 26 is disposed to drive the main shaft 17 through driving means generally indicated at 29, and a centrifugal clutch similar in construction to the clutch 12 is disposed on the shaft 28 of this motor 26. Thus the motor 26 drives the main shaft 17 through the driving means generally indicated at 29 when the centrifugal clutch 30 is actuated upon this motor reaching its normal speed, and this motor will operate independently of any other driving means such as the motor 10.

A generator 32 driven by the axle of the car supplies current for the motor 26 upon the closing of the thermostatic switch 42 in the compartment 22. A storage battery is connected across the conductors 27 leading from generator 32 and an automatic switch, generally indicated at 33 is in this circuit to connect and disconnect the generator and battery in accordance with the voltage of the former. Thus before the generator 32 reaches its normal speed, or when generator 32 is idle, switch 33 is open and the motor 26 operates with the storage battery 31 acting as the source of current. But when the generator 32 reaches its normal speed, switch 33 closes and the motor 26 is supplied with current from the generator 32. An automatic regulator 40 controls the field of the generator 32 to regulate the output of the generator in spite of speed changes in the generator driven from the car axle. Generator 32 and battery 31 are preferably those that supply energy to light the car; standard car-lighting systems operate at a lamp voltage that is in the neighborhood of 32 volts. Hence motor 26 is a direct-current motor constructed to operate at a voltage of about 32 volts. This voltage, it is to be noted, is relatively low compared to the usually available 110 volt A. C. or D. C. commercial circuits.

I have provided a plug 34 connected by conductors 35 to the opposite terminals of storage battery 31. Plug 34 may be connected to an outside and independent source of charging current of relatively low voltage appropriate for charging the battery 31, which is usually a 16-cell battery to operate the motor 26. This charging system is especially valuable when the cars are laid over for long intervals of time in the yards and the generator, driven by the axle, is inactive. At such times the battery 31 may be charged and the motor 26 operated without depleting the battery.

One side of the generator 32 is connected by a conductor 36 to one side of the motor 26. The opposite side of motor 26 is connected by a line 41ª to the contact 41 of the switch 39, and the other contact 38 of switch 39 is connected by conductors 49 and 37 to the opposite side of the generator 32. Thus a circuit is established between the motor 26 and the generator 32 when the switch 39 is closed, bridging the contacts 38 and 41.

Switch 39 is actuated by a solenoid 48 and one side of this solenoid 48 is connected by the conductors 49 and 37 to one side of the generator 32. The opposite side of this solenoid 48 is connected by the conductor 47 to the contact 46 of the switch 45. Connected to the opposite contact 44 of this switch 45 is a conductor 43 leading to one side 42ª of the thermostatic switch 42 positioned in the container 22. The opposite side 51 of this thermostatic switch 42 is connected by conductors 50 and 36 to the opposite side of the generator 32. If the switch 45 bridges the contacts 46 and 44, solenoid 48 becomes energized by current from the generator 32 or from battery 31 or from the outside source connected to plug 34, upon the closing of the thermostatic switch 42. Thus it will be seen that the thermostatic switch 42 controls the circuit of the motor 26, and inasmuch as the thermostatic switch 42 is dependent upon the temperature in the compartment 22, the actuation of this motor will be dependent upon the temperature therein.

The switch 45 is of a double contact construction, in one position bridging the contacts 46 and 44, and in the other position bridging the contacts 67 and 68. A solenoid 54 actuates this switch and when this solenoid is de-energized, the switch bridges contacts 46 and 44 by force of gravity; but upon energization of solenoid 54, the switch 45 bridges contacts 67 and 68.

A plug 52 adapted to be connected to an outside 110 volt A. C. or D. C. source of current is connected by conductors 53 to the opposite terminals of the solenoid 54 so that upon being connected to such an outside source solenoid 54 is energized and pulls up switch 45, and as described above, switch 45 bridges contacts 67 and 68. One terminal of the motor 10 is connected by a line 61 to contact 60 of a switch 59, and the other contact 58 of this switch is connected by a conductor 57 to one side of plug 52. The other side of plug 52 is connected by a conductor 55 to the opposite side of the motor 10. Thus, when an outside 110 volt A. C. or D. C. source of current is connected to the plug 52, the motor 10 will be energized upon the closing of the switch 59.

The actuation of switch 59 is controlled by a solenoid 63 so constructed that, upon the de-energization thereof, switch 59 opens the circuit in which are included contacts 60 and 58, but upon energization of solenoid 63, switch 59 closes, bridging these contacts.

One side of the solenoid 63 is connected by conductors 65 and 37 to one side of the low voltage circuit 35—35, to which is connected the generator 32, the battery 31, or both, or the low voltage outside source by way of plug 34. The opposite side of this low voltage circuit 35—35 is connected by conductors 36 and 50 to one side 51 of the thermostatic switch 42. The opposite side 42ª of the thermostatic switch 42 is connected by a conductor 43 to the contact 68 of the switch 45. Contact 67 of the switch 45 is connected by a conductor 66 to the opposite side of the solenoid 63.

If the thermostatic switch 42 is closed and the solenoid 54 is energized, the switch 45 will bridge the contacts 67 and 68, whereupon a circuit is established between solenoid 63 and the low voltage source connected to circuit 35—35, and upon energization of solenoid 63, a circuit is established between the high voltage outside source of current connected to the plug 52 and the high voltage electric motor 10. Thus when the parts are in this position the thermostatic switch 42 controls the circuit between the outside high voltage source of current connected to the plug 52 and the motor 10 through the dual action of the solenoids 54 and 63.

Referring now to the action of this system, for purposes of illustration, let it be assumed that it is installed in the dining car of a railroad train. The refrigerating equipment of these cars includes, as above noted, two refrigerating compartments, a small one 25 maintained at a comparatively low temperature for storing frozen food stuffs, such as ice cream, and a larger compartment 22 to be maintained at a comparatively higher temperature for those foods which may be harmed if stored over any period of time at a temperature below freezing or thereabouts. Although the higher temperature is to be maintained in the larger compartment 22, the greater surface of its walls makes for a greater heat leakage therefrom, and I have found that the interior of this compartment rises above the preferred temperature before the temperature in the smaller compartment 25 rises above that temperature preferred in this compartment.

Furthermore, let it be assumed that the car is in motion so that automatic switch 33 is closed and the generator 32 is connected to the battery 31 and either or both are available to supply energy to the motor 26. The compartments 22 and 25 may be assumed to have stored therein the respective perishable goods to be maintained at different temperature values. When the temperature in the compartment 22 rises above that preferred the thermostatic switch 42 will close. As the plug 52 is not connected to an outside source of electricity, the solenoid 54 is not energized, and, as described above, the switch 45 is then in a position where it bridges the contacts 44 and 46. Thus upon the closing of the thermostatic switch 42 a circuit is established between the solenoid 48 and the generator 32, now being actuated by the rotating axle of the car and connected through closed switch 33 to the battery 31, consisting of conductors 36 and 50, contact 51, thermostatic switch 42, conductor 43, contact 44, switch 45, contact 46, conductor 47, to the solenoid 48, and from the other side of this solenoid through conductors 49 and 37 to the other side of the generator 32 and battery 31. As soon as this circuit is completed, the switch 39 is actuated by solenoid 48 to bridge the contacts 38 and 41, thus closing a circuit supplying energy to the motor 26, this circuit consisting of the conductors 37 and 49, contact 38, switch 39, contact 41, conductor 41*a* to one side of this motor, and from the other side of this motor through conductor 36 leading to the other side of the generator 32 and battery 31.

Upon the completion of this circuit, the motor 26 is actuated and when the motor has attained its normal speed, the centrifugal clutch 30 is actuated to connect the shaft 28 of the motor with the driving means generally indicated at 29 to drive the main shaft 17. Although main shaft 17 actuates the driving means generally indicated at 15, it does not actuate the motor 10, for, as described above, the centrifugal clutch 12 is interposed therebetween and is not actuated unless motor 10 is operating at its normal speed; but the motor 10 is not supplied with energizing current and is idle. The shaft 17 actuates the compressors 18 and 19 of the separate refrigeration units diagrammatically indicated respectively at 20 and 23 to cool the compartments 22 and 25 by means of the refrigerating coils 21 and 24.

It will be seen that the actuation of motor 26 depends upon the closing of the thermostatic switch 42, and this thermostatic switch 42 will stay closed until the preferred temperature has been reached in the compartment 22. If the temperature in the compartment 25 should fall to that preferred therein before the temperature in the compartment 22 reaches its normal, the thermostatic valve 69 in the compartment 25 closes, thus stopping the flow of the refrigerant through the cooling coils 24 in this compartment. In this manner the temperature of the compartment 25 is regulated independently of the temperature in the compartment 22 and is maintained constantly at that preferred temperature whether or not the motor 26 is driving the compressor 19.

When the temperature in the compartment 22 has reached that preferred, the thermostatic switch 42 opens, thus breaking the energizing circuit of the solenoid 48. Upon de-energization of the solenoid 48, switch 39 opens and moves out of engagement with the contacts 38 and 41 and the energizing circuit of the motor 26 is broken. The operation of the motor 26 then ceases and consequently the compressors 18 and 19 are not actuated and no refrigerating action will take place either in the coils 21 or 24. The parts remain in this position until the temperature within compartment 22 rises above the preferred temperature when the above described action will be repeated.

Should the railway train stop or slow down so as to cause disconnection of the generator 32 from the storage battery 31, the latter is available to supply energy to motor 26 during such periods; hence I am enabled to achieve the intended refrigerating action without interference from slow speed or stoppages of the dining car.

It often happens, however, that these dining cars are laid over in yards for considerable periods of time; in such yards there is generally available a usual 110 volt A. C. or D. C. lighting or power circuit. To avoid draining and overtaxing of the storage battery during these periods, I have provided means for automatically adapting my refrigerating system to such an outside source or current so that the latter may supply energy to the motive means of my system.

If the plug 52 is connected to such an outside source of circuit, such as the usual 110 volt A. C. or D. C. lighting current, the solenoid 54 is energized, for the solenoid is connected across the lines 53 leading from the plug 52. Upon energization solenoid 54 moves the switch 45 into its upper position, bridging the contacts 67 and 68. Bridging of contacts 67 and 68 causes a circuit to be established between the storage battery 31 (for the generator 42 is now inactive) and the solenoid 63, depending upon the position of the thermostatic switch 42; this circuit consists of conductors 37 and 65 to one side of solenoid 63, and from the other side of this solenoid, through conductor 66, contact 67, switch 45, contact 68, conductor 54, thermostatic switch 42, contact 51 and conductor 50 to the other terminal 36[a] of the storage battery 31.

Energization of solenoid 63 moves switch 59 into closing position, closing a circuit between the high voltage source connected to the plug 52 and the motor 10; thus I have re-adapted this system so that it may be operated automatically from an outside source of current, and such operation will depend upon the closing of the thermostatic switch 42 in the compartment 22.

Assuming the temperature in the compartment 22 to be above that preferred when the parts are in the condition noted above, the thermostatic switch 42 closes to complete a circuit between the storage battery 31 and the solenoid 63. This circuit, outlined above, energizes the solenoid 63 and thus closes the switch 59, bridging the contacts 60 and 58.

A circuit is now established between the high voltage source connected to the plug 52 and the motor 10, consisting of the conductor 61, contact 60, switch 59, contact 58, conductor 57 to one side of the plug, and from the other side of the plug through a conductor 55 to the other side 56 of the motor 10. When the motor 10 reaches its normal speed, the centrifugal clutch 12 is actuated to connect motor 10 to drive the main shaft 17 through the driving means generally indicated at 15. The compressors 18 and 19 are then set in motion and refrigeration takes place in both of the compartments. The thermostatic valve 69 in the compartment 25 will operate in the manner outlined above so that the interior of this compartment will not fall below the preferred temperature regardless of whether or not the compressor 19 is being actuated.

Switch 45, moved into its upper position by the energization of winding 54, has so rearranged the circuits, as will be clear in view of the foregoing, that the same thermostatically controlled switch 42 in compartment 22 is now effective to control the operation of the high voltage motor 10 but is ineffective to control the operation of the low voltage motor 26, since the circuit of solenoid 48, whose switch member 39 controls the energizing circuit of motor 26, is held open by solenoid 54 from the contacts 46—44.

Refrigeration continues until the temperature in the compartment 22 reaches that preferred, when the thermostatic switch 42 opens, breaking the circuit between the solenoid 63 and the storage battery 31. This action de-energizes the solenoid 63 and the switch 59 moves out of engagement with the contacts 60 and 58. Upon the opening of the switch 59, the circuit between the plug 52 and the motor 10 is broken and the motor 10 and parts driven thereby cease operation. Thus the parts remain motionless until a time when the temperature in the compartment 22 rises above that preferred. In such case the above action will be repeated until the plug 52 is removed from the outside source of current. The removal of this plug 52 disconnects the outside source to de-energize the solenoid 54 and the switch 45 then bridges the contacts 44 and 46, thus automatically adapting the system to operation, by low voltage motor 26, from the generator 32 or the storage battery 31 or both. Contacts 44 and 46, bridged by switch 45, now place the circuit of low voltage motor 26 in the control of thermostatic switch 42, whence the car may be placed again in transit, motor 26 receiving energy from generator 32 and/or battery 31.

It will thus be seen that a thoroughly practical refrigeration system for a dining car has been provided which will operate efficiently under all conditions and which is designed to be operated economically from the most available source of energy by employing a single motive means for driving the moving parts of two refrigeration units. I insure efficient operation by a reduction of unnecessary equipment, thus eliminating the hazard of poor refrigeration through the breakage of non-essential moving parts.

Although the control of the actuation of the moving parts of this refrigeration system is limited to thermostatic means in one of the compartments to be refrigerated, by my provision of the thermostatic valve 69 on the refrigerating coil 24 in the compartment 25, adequate means have been disclosed for insuring a constant preferred temperature in both compartments at all times. Furthermore, by the provision of extra means for charging the storage battery 31 and also by being able to automatically readapt my system so that it may be used by an outside source of current, I have provided adequate means for easing the usual wear and tear on the power plants of these cars. These and many other important advantages of this system will be easily perceived from the above disclosure.

As many possible embodiments may be made of the above invention, and as many changes may be made in the embodiment above set forth, it is to be understood that all matter hereinabove set forth or shown in the accompanying drawing is to be interpreted as illustrative and not in a limiting sense.

I claim:

1. In refrigeration apparatus, in combination, a means forming a space to be cooled, a refrigeration unit for said space, an electric motor for driving an actuated element of said unit, a second electric motor for driving said element of said unit, a thermostatic switch in the circuit of one of said motors, and a means responsive to the completion of the circuit to the other motor for making ineffective the circuit to the said one motor and for inserting said switch in the circuit of said other motor.

2. In refrigeration apparatus, in combination, a space in a railway vehicle to be cooled, a refrigeration unit positioned on said car for cooling said space, a relatively high voltage motor for driving an element of said unit, means for connecting an outside source of current to said high voltage motor, a relatively low voltage motor for driving said element of said unit, a low voltage generator disposed on said car and driven by the axle of said vehicle for supplying current to said low voltage motor, means operatively connecting said motors to said element and adapted to prevent one of said motors from being driven when the other motor is driving said element, a thermostatic switch, and means responsive to the completion of the circuit between either motor and its corresponding source of current for placing said thermostatic switch in said circuit.

3. In refrigeration apparatus, in combination, a relatively high voltage motor for driving an element of said apparatus, means for connecting an outside source of current to said high voltage motor, a relatively low voltage motor for driving said element of said apparatus, a low voltage generator for supplying current to said low voltage motor, means operatively connecting said motors to said element and adapted to prevent one of said motors from being driven when the other motor is driving said element, and means responsive to the completion of a circuit between one of said motors and its corresponding source of current for disconnecting the other motor from its corresponding source of current.

4. In refrigeration apparatus, in combination, a relatively high voltage motor for driving an element of said apparatus, means for connecting an outside source of current to said high voltage motor, a relatively low voltage motor for driving said element of said apparatus, a low voltage generator for supplying current to said low voltage motor, means operatively connecting said motors to said element and adapted to prevent one of said motors from being driven when the other motor is driving said element, means responsive to the completion of a circuit between one of said motors and its corresponding source of current for disconnecting the other motor from its corresponding source of current, a thermostatic switch, and means for placing said thermostatic switch in the completed circuit.

5. In refrigeration apparatus, in combination, a space in a railway car to be cooled, a refrigeration unit positioned on said car for cooling said space, a relatively high voltage motor for driving an element of said unit, means for connecting an outside source of current to said high voltage motor, a relatively low voltage motor for driving said element of said unit, a low voltage generator disposed on said car for supplying current to said low voltage motor, and means responsive to the completion of a circuit between one of the motors and its corresponding source of current for breaking the circuit between the other source of current and the other motor.

6. In refrigeration apparatus, in combination, a relatively high voltage motor for driving an element of said apparatus, a relatively low voltage motor for driving said element, means responsive to the effective condition of the circuit supplying energy to one of said motors for preventing the operation of the other motor, a thermostatic switch, and means for automatically placing said thermostatic switch in the effective circuit.

7. In refrigeration apparatus, in combination, an electric motor for driving an element of said apparatus, a second electric motor for driving said element of said apparatus, two sources of current for said motors, a switch adapted to close a circuit between said first-mentioned motor and its source of current when in one position and adapted to close a circuit between said second-mentioned motor and its source of current when in another position, a solenoid for actuating said switch, said solenoid adapted to force said switch into said last-mentioned position when energized and said solenoid adapted to be connected to said last-mentioned source of current, and a thermostatic switch in the circuit of said first-mentioned switch.

8. In a refrigeration system, in combination, a chamber whose temperature is to be regulated, a compartment whose temperature is to be maintained lower than the temperature of said chamber, said chamber adapted to rise above its preferred temperature before said compartment rises above its preferred temperature, a refrigeration unit for cooling said chamber, a refrigeration unit for cooling said compartment, means for driving elements of said units, thermostatic means responsive to the temperature of said chamber for controlling the operation of said last-mentioned means, and thermostatic means responsive to the temperature of said compartment for controlling the operation of said second-mentioned unit irrespective of the operative condition of said driving means.

9. In a refrigeration system, in combination, a chamber whose temperature is to be regulated, a compartment whose temperature is to be maintained below the temperature of said chamber, a refrigeration unit for said chamber, a refrigeration unit for said compartment, apparatus for driving the driven elements of both of said units, thermostatic means responsive to the temperature of said chamber for controlling the operation of said apparatus, and thermostatic means responsive to the temperature of said compartment for controlling the effective operation of said second-mentioned unit regardless of the operative condition of said apparatus.

10. In a refrigeration system, in combination, a chamber whose temperature is to be regulated, a compartment whose temperature is to be maintained below the temperature of said chamber, a refrigeration unit for said chamber, a refrigeration unit for said compartment, an electric motor for driving elements of both of said units, a source of power, and a thermostatic switch in the circuit of said source of power and said electric motor, said switch being responsive to the temperature of said chamber.

11. In a refrigeration system, in combination, a chamber whose temperature is to be regulated, a compartment whose temperature is to be maintained below the temperature of said chamber, a refrigeration unit for said chamber, a refrigeration unit for said compartment, an electric motor for driving elements of both of said units, a source of power, a thermostatic switch in the circuit of said source of power and said electric motor, said switch being responsive to the temperature of said chamber, and thermostatic means responsive to the temperature of said compartment for controlling the effective operation of said second-mentioned unit regardless of whether said motor is running.

12. In a refrigeration system, in combination, a chamber whose temperature is to be regulated, a compartment whose temperature is to be maintained below the temperature of said chamber, a refrigeration unit for said chamber, a refrigeration unit for said compartment, an electric motor adapted to drive certain elements of both of said units, a second electric motor adapted to drive said elements, a storage battery, a circuit between said storage battery and said first-mentioned motor, a thermostatic switch in said circuit and responsive to the temperature of said compartment, and means for connecting said second-mentioned motor to an outside source of current, said means adapted upon said connection to break said first-mentioned circuit and place said thermostatic switch in said second-mentioned circuit 13. In refrigeration apparatus, in combination, a vehicle having a space whose temperature is to be controlled, a refrigeration unit for said space, electric motive means adapted to drive an element of said unit, a source of current carried by said vehicle, a circuit between said source of current and said motive means, and means responsive to the completion of a circuit between said motive means and an outside source of current for breaking said first-mentioned circuit.

14. In refrigeration apparatus, in combination, a vehicle having a space whose temperature is to be controlled, a refrigeration unit for said space, electric motive means adapted to drive an element of said unit, a source of current carried by said vehicle, a circuit between said source of current and said motive means, a thermostatic switch in said circuit, and means responsive to the completion of a circuit between an outside source of current and said motive means for breaking said first-mentioned circuit and placing said thermostatic switch in said newly completed circuit.

15. In refrigeration apparatus, in combination, a vehicle having a space whose temperature is to be controlled, a refrigeration unit for said space, electric motive means adapted to drive an element of said unit, a source of current carried by said vehicle, a circuit between said source of current and said motive means, a thermostatic switch, and means responsive to the completion of a circuit between an outside source of current and said motive means for placing said thermostatic switch in said newly completed circuit.

16. In a railway car having a space whose temperature is to be controlled, a refrigeration unit for said space, an alternating current motor for driving an element of said refrigeration unit, a direct current motor for driving an element of said unit, a source of direct current on said vehicle, means forming a circuit between said source of current and said direct current motor, and means responsive to the completion of a circuit between said alternating current motor and an outside source of alternating current for breaking said first-mentioned circuit.

17. In a railway car having a space whose temperature is to be controlled, a refrigeration unit for said space, and alternating current motor for driving an element of said refrigeration unit, a direct current motor for driving an element of said unit, a source of direct current on said vehicle, means forming a circuit between said source of current and said direct current motor, a thermostatic switch responsive to the temperature of said space in said circuit, and means responsive to the completion of a circuit between an outside source of alternating current and said alternating current motor for breaking said first-mentioned circuit and placing said thermostatic switch in said second-mentioned circuit.

18. In refrigeration apparatus, in combination, means forming a space to be cooled, a refrigeration unit for said space, an electric motor for driving an actuated element of said unit, a control circuit for said motor for controlling the element-driving operation of said motor, a second electric motor for driving said element of said unit, a control circuit for said second motor for controlling the element-driving operation thereof, a thermostatic switch for controlling the flow of energy in the control circuit of one of said motors, said control circuits having connections whereby they derive energy from the source of current supplying energy to said first motor, and means responsive to the completion of the circuit to said second motor for making ineffective the control, by the control circuit related to said first motor, of the element-driving operation of said first motor and for inserting said switch in the control circuit of said second motor.

19. In refrigerating apparatus, in combination, means forming a space to be cooled, a refrigeration unit for said space, a direct current motor for driving an actuated element of said unit, a direct current source of electrical energy, a second electric motor for driving said element of said unit, said second motor being capable of operation when energized from an alternating current source, a control circuit for said direct current motor for controlling the starting and stopping thereof as a motor, a control circuit for said second motor for controlling the starting and stopping thereof as a motor, both of said control circuits being connected through a thermostatic switch in the circuit of the direct current source that supplies energy to said direct current motor, and means responsive to the completion of the circuit to said second electric motor from a suitable source for making ineffective the control circuit to said direct current motor as a starting and stopping control circuit and for inserting said switch in the control circuit of said second electric motor.

20. In refrigerating apparatus, in combination, means forming a space to be cooled, a refrigeration unit for said space, a direct current motor for driving an actuated element of said unit, a direct current source of electrical energy, a second electric motor for driving said element of said unit, said second motor being capable of operation when energized from an alternating current source, a control circuit for said direct current motor for controlling the starting and stopping thereof as a motor, a control circuit for said second motor for controlling the starting and stopping thereof as a motor, a thermostatic switch in the control circuit of said direct current motor, whereby said switch controls the action of said control circuit in starting and stopping said direct current motor, a source of current adapted to drive said second motor, and means responsive to the completion of the circuit from said second-mentioned source to said second motor for making ineffective the starting and stopping control by the control circuit of said direct current motor and for inserting said switch in the control circuit of said second motor.

21. In refrigerating apparatus, in combination, means forming a space to be cooled, a refrigeration unit for said space, a direct current motor for driving an actuated element of said unit, a direct current source of electrical energy, a second electric motor for driving said element of said unit, said second motor being capable of operation when energized from an alternating current source, a control circuit for said direct current motor for controlling the starting and stopping thereof as a motor, a control circuit, including relay means, for said second motor for controlling the starting and stopping thereof as a motor, a thermostatic switch, responsive to the needs of said space for refrigeration, in the control circuit of said direct current motor, whereby said switch controls the action of said control circuit in starting and stopping said direct current motor in accordance with the needs of said space for refrigeration, said direct current motor control circuit including relay means deriving energizing current from said direct current source, and means including said first-mentioned relay means, responsive to the completion of the circuit from a suitable source to said second motor for making ineffective the starting and stopping action of the control circuit of said direct current motor and for inserting said direct current source and said switch in the control circuit of said second-mentioned motor, whereby the control circuit of the latter and its relay means derive energizing current from said direct current source.

22. In a railway car having a space whose temperature is to be controlled, a refrigeration unit for said space, an alternating current motor for driving an element of said refrigeration unit, a direct current motor for driving an element of said unit, a source of direct current on said vehicle, means forming a circuit between said source of current and said direct current motor and including switching means for starting and stopping said direct current motor and hence the element driven thereby, a control circuit deriving energy from said direct current source for controlling said switching means, temperature-controlled means in said control circuit for controlling the action thereof on said switching means, a control circuit for said alternating current motor, and means responsive to the completion of a circuit between said alternating current motor and an outside source of alternating current for breaking the effectiveness of said first-mentioned control circuit as a starting and stopping control for the drive of said element by said direct current motor and for placing said temperature-controlled means and said direct current source in said second-mentioned control circuit.

23. In refrigeration apparatus, in combination, a vehicle having a space whose temperature is to be controlled, a refrigeration unit for said space, electric motive means adapted to drive an element of said unit, a source of current carried by said vehicle, a circuit between said source of current and said motive means, whereby said circuit is effective to supply current to said motive means to cause the latter to drive said element, said vehicle carrying one element of separable connector means connected operatively to said electric motive means, whereby, with a mating element thereof, a circuit thereto from an outside source may be completed, and means responsive to the completion by said connector means of a circuit between said motive means and an outside source of current for breaking the effectiveness of said first-mentioned circuit in supplying current to said motive means, whereby the latter derives its energy for driving said element from said outside source and the supply of energy thereto from the said source carried by the vehicle ceases.

24. In a railway car having a space whose temperature is to be controlled, a refrigeration unit for said space, an alternating current motor for driving an element of said refrigeration unit, a direct current motor for driving an element of said unit, a source of direct current on said vehicle, means forming a circuit between said source of current and said direct current motor, temperature-controlled switching means for controlling the making and breaking of the current flow from said source to said direct current motor, and means responsive to the completion of a circuit between said alternating current motor and an outside source of alternating current for breaking the current flow in the direction from said source of direct current to said direct current motor in said first-mentioned circuit and for subjecting the flow of current from said outside source to said alternating current motor to the controlling action of said temperature-controlled switching means.

25. In a railway car having a space whose temperature is to be controlled, a refrigeration unit for said space, an alternating current motor for driving an element of said refrigeration unit, a direct current motor for driving an element of said unit, a source of direct current on said vehicle, means forming a circuit between said source of current and said direct current motor, a control circuit deriving energy from said direct current source for controlling the effectiveness of said circuit to supply current from said source to said direct current motor, temperature-controlled means for controlling said control circuit, and means including relay means deriving energy from said direct current source and responsive to the completion of a circuit between said alternating current motor and an outside source of alternating current for breaking the effectiveness of said first-mentioned circuit in supplying motor-driving energy to said direct current motor and for subjecting the operation of said alternating current motor to said temperature-controlled means.

26. In a railway car having a space whose temperature is to be controlled, a refrigeration unit for said space, an alternating current motor for driving an element of said refrigeration unit, a direct current motor for driving an element of said unit, a source of direct current on said vehicle, means forming a circuit between said source of current and said direct current motor, temperature-controlled means for controlling the energy flow in said circuit, means responsive to the completion of a circuit between said alternating current motor and an outside source of alternating current for breaking the effectiveness of said first-mentioned circuit in supplying motor-driving energy to said direct current motor, and switching means operated in response to the completion of the circuit between said alternating current motor and said outside source for placing the control of the flow of current to said alternating current motor under said temperature-controlled means.

27. In refrigeration apparatus, in combination, a space in a railway car to be cooled, a refrigeration apparatus positioned on said car for cooling said space, a relatively high voltage motor capable of being operated by alternating current for driving an element of said apparatus, means for connecting an outside source of current to said high voltage motor, a relatively low voltage direct current motor for driving said element of said unit, a source of direct current disposed on said car for supplying current to said direct current motor, means responsive to the effective condition of the circuit supplying energy to one of said motors for preventing the driving operation of the other of said motors, a thermostatic switch responsive to the temperature in said space, and means for automatically placing said thermostatic switch in control of the effective circuit.

28. In refrigeration apparatus, in combination, a space in a railway car to be cooled, a refrigeration apparatus positioned on said car for cooling said space, a relatively high voltage motor capable of being operated by alternating current for driving an element of said apparatus, means for connecting an outside source of current to said high voltage motor and for thereby providing a circuit therefor capable of supplying energy to said motor, a relatively low voltage direct current motor for driving said element, a source of direct current disposed on said car for supplying current to said direct current motor, means responsive to the effective condition of the circuit supplying energy to said high voltage motor for preventing the driving operation of said element by the other motor and including means for making the condition of the circuit of the said other motor ineffective to supply energy thereto from said direct current source, a thermostatic switch responsive to the temperature of said space, and means responsive to the placing of the circuit of said high voltage motor in effective condition for automatically placing said thermostatic switch in control of the effective circuit.

29. In refrigeration apparatus, in combination, a vehicle having a space whose temperature is to be controlled, a refrigeration unit for said space, electric motive means adapted to drive an element of said unit, said electric motive means comprising two motors, one of which is a direct current motor and the other of which is a motor capable of operation when supplied with alternating current, a source of direct current carried by said vehicle, said source comprising a storage battery and a generator to supplement said storage battery and to charge the latter, said generator being operative when said vehicle is in motion, a circuit between said source of current and the direct current motor of said electric motive means, whereby said generator and battery or the battery alone may supply energy to said direct current motor depending upon whether said generator is operative or not, and means responsive to the completion of a circuit between said other motor of said electric motive means and an outside source of current for breaking the flow of direct current to said direct current motor in said first-mentioned circuit, thereby avoiding depletion of said battery and permitting operation of said element of the refrigeration unit particularly when said vehicle is not in motion.

30. In refrigeration apparatus, in combination, a vehicle having a space whose temperature is to be controlled, a refrigeration unit for said space, electric motive means adapted to drive an element of said unit, said electric motive means comprising two motors, one of which is a direct current motor and the other of which is a motor capable of operation when supplied with alternating current, a source of direct current carried by said vehicle, said source comprising a storage battery and a generator to supplement said storage battery and to charge the latter, said generator being operative when said vehicle is in motion, a circuit between said source of current and the direct current motor of said electric motive means, whereby said generator and battery or the battery alone may supply energy to said direct current motor depending upon whether said generator is operative or not, a control circuit shunted across said source of direct current and having therein temperature-controlled means for controlling said first-mentioned circuit and for controlling the operation of said element by said direct current motor of said electric motive means, a second but normally open control circuit shunted across said source of direct current and also having therein said temperature-controlled means and adapted, when completed, to control the operation of said other motor of said electric motive means, and switching and relay means responsive to the completion of a circuit between said other motor of said electric motive means and an outside source of current respectively for closing said second control circuit and thereby adapting it for control of the operation of said other motor and for breaking the flow of current from said direct current source to said direct current motor in said first-mentioned circuit.

31. In refrigeration apparatus, in combination, a vehicle having a space whose temperature is to be controlled, a refrigeration unit for said space, electric motive means adapted to drive an element of said unit, said electric motive means comprising two motors, one of which is a direct current motor and the other of which is a motor capable of operation when supplied with alternating current, a source of direct current carried by said vehicle, said source comprising a storage battery and a generator to supplement said storage battery and to charge the latter, said generator being operative when said vehicle is in motion, a circuit between said source of current and the direct current motor of said electric motive means, whereby said generator and battery or the battery alone may supply energy to said direct current motor depending upon whether said generator is operative or not, relay means which, when made effective, operates to break the flow of current from said source to said direct current motor in said first-mentioned circuit, and switching means for controlling said relay means and responsive to the completion of a circuit between said other motor of said electric motive means and an outside source of current for placing said relay means in an energizing circuit, thereby to permit it to become effective, for breaking the flow of current from said direct current source to said direct current motor in said first-mentioned circuit.

32. In refrigeration apparatus, in combination, a vehicle having a space whose temperature is to be controlled, a refrigeration unit for said space, electric motive means adapted to drive an element of said unit, said electric motive means being capable of operation when energized from a direct current source or when energized from an alternating current source, a source of direct current carried by said vehicle, a circuit between said source of direct current and said motive means, whereby said circuit is effective to supply direct current to said motive means to cause the latter to drive said element, said vehicle carrying one element of detachable plug means connected operatively to said electric motive means, whereby, with a mating element thereof, a circuit thereto from an outside source, which may be an alternating current source, may be completed, temperature-controlled means for controlling said first-mentioned circuit and hence for controlling the operation of said element when said electric motive means is energized from said direct current source, and means responsive to the completion by said plug means of a circuit between said motive means and said outside source of current for breaking the effectiveness of said first-mentioned circuit in energizing said motive means from said direct current source and for subjecting the energization of said motive means from said outside source to the control of said temperature-controlled means.

33. In refrigeration apparatus, in combination, a vehicle having a space whose temperature is to be controlled, a refrigeration unit for said space, electric motive means adapted to drive an element of said unit, a source of direct current, including a storage battery, carried by said vehicle, a circuit between said source of direct current and said motive means whereby said circuit is effective to supply direct current to said motive means to cause the latter to drive said element particularly when said vehicle is in motion, said vehicle carrying elements of separable connector means whereby, with mating elements thereof, connection may be made to outside electrical energy-supplying means, particularly when said vehicle is not in motion, means responsive to the completion by said connector means of a circuit between said motive means and said outside energy-supplying means for breaking the effectiveness of said first-mentioned circuit in supplying current from said storage battery to said electric motive means, and means whereby energy from said outside energy-supplying means achieves charging of said storage battery.

34. In refrigeration apparatus, in combination, a vehicle having a space whose temperature is to be controlled, a refrigeration unit for said space, electric motive means adapted to drive an element of said unit, said electric motive means comprising two motors, either of which, when energized as a motor, may drive said element, a source of current carried by said vehicle, a circuit between said source of current and one of said motors of said electric motive means, said one motor being constructed to adapt it to the characteristics of said source of current whereby the latter may supply energy to said one motor to effect driving of said element, control circuit means, including relay means, for controlling the operation of said electric motive means, said relay means acting, when effective, to break the flow of current from said source to said one motor in said first-mentioned circuit, said vehicle carrying separable connector means whereby, with mating elements thereof, connection may be made to outside electrical energy-supplying means to the characteristics of which said other motor of said electric motive means is adapted, and means responsive to the completion by said connector means of a circuit between said other motor and said outside energy-supplying means for making said relay means effective, whereby said unit may be driven by said other motor and flow of energy in a direction from said source to said one motor ceases.

GEORGE E. HULSE.